United States Patent [19]

Yamagami et al.

[11] Patent Number: 4,992,889
[45] Date of Patent: Feb. 12, 1991

[54] ENCODING APPARATUS FOR COMPRESSING AND OUTPUTTING IMAGE DATA

[75] Inventors: Taku Yamagami, Yokohama; Makoto Takayama, Kawasaki, both of Japan

[73] Assignee: Canon Kabushiki Kaisha, Tokyo, Japan

[21] Appl. No.: 468,248

[22] Filed: Jan. 9, 1990

Related U.S. Application Data

[63] Continuation of Ser. No. 374,627, Jun. 30, 1989, abandoned, which is a continuation of Ser. No. 117,959, Nov. 9, 1987, abandoned.

[30] Foreign Application Priority Data

Nov. 13, 1986 [JP] Japan ................................. 61-271467

[51] Int. Cl.$^5$ ........................................... H04N 1/417
[52] U.S. Cl. ..................... 358/430; 358/133; 358/135; 358/426
[58] Field of Search ............... 358/261, 133, 135, 136, 358/260, 261.2, 426, 430

[56] References Cited

FOREIGN PATENT DOCUMENTS

| 59-171262 | 9/1984 | Japan | 358/260 |
| 60-191566 | 9/1985 | Japan | 358/261 |
| 60-213172 | 10/1985 | Japan | 358/261 |

Primary Examiner—Edward L. Coles, Sr.
Attorney, Agent, or Firm—Fitzpatrick, Cella, Harper & Scinto

[57] ABSTRACT

An encoding apparatus for compressing and outputting image data by performing prediction differential encoding of the image data. The apparatus forms first prediction data, receives the image data and forms and outputs first differential data which is equal to the difference between the received image data and the first prediction data. The apparatus also quantizes the first differential data and forms first quantization differential data. Second predication data is formed and output, and a second differential data which is equal to the difference between the first prediction data and the second prediction data.

14 Claims, 18 Drawing Sheets

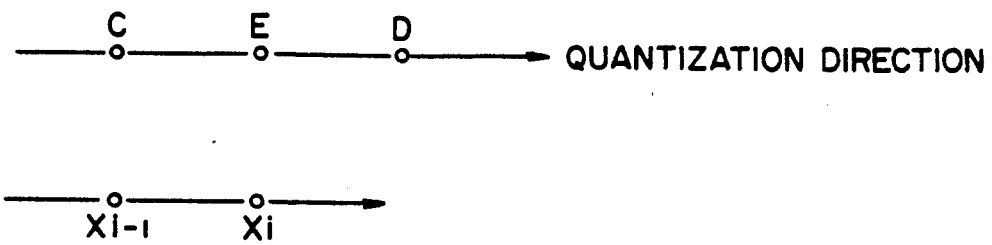
FIG. 1
PRIOR ART
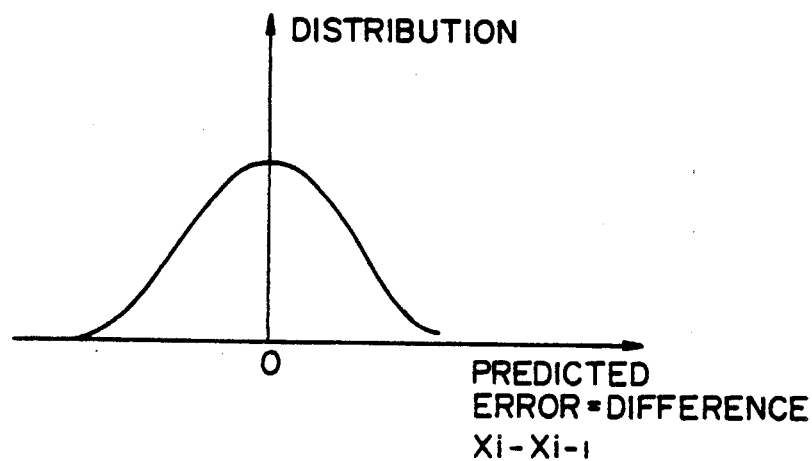
(1) PRELIMINARY VALUE PREDICTION
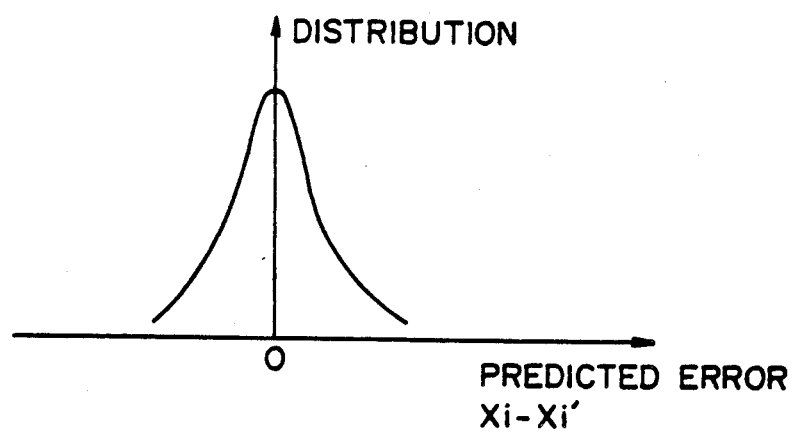
(2) TWO-DIMENSIONAL PREDICTION
FIG. 2
PRIOR ART

FIG. 8

CODE SYSTEM AND CODE LENGTH ASSIGNMENT TABLE

CODE ASSIGNMENT TABLE $[X_i' - \langle X_{i-1} \rangle] = 2$

CODE SYSTEM = 2/4/9

| $[X_i - \langle X_{i-1} \rangle]$ | CODE |
|---|---|
| ⋮ | ⋮ |
| −10 | 0 0 0 0 0 1 0 0 0 |
| −9  | 0 0 0 0 0 0 1 1 1 |
| −8  | 0 0 0 0 0 0 1 1 0 |
| −7  | 0 0 0 0 0 0 1 0 1 |
| −6  | 0 0 0 0 0 0 1 0 0 |
| −4  | 0 0 0 0 0 0 0 1 1 |
| −3  | 0 0 0 0 0 0 0 1 0 |
| −2  | 0 0 0 0 0 0 0 0 1 |
| −1  | 0 0 0 0 0 0 0 0 0 |
| 0   | 0 0 0 1 |
| 1   | 0 1 |
| 2   | 1 0 |
| 3   | 1 1 |
| 4   | 0 0 1 0 |
| 5   | 0 0 1 1 |
| 6   | 0 0 0 0 1 0 0 0 0 |
| 7   | 0 0 0 0 1 0 0 0 1 |
| 8   | 0 0 0 0 1 0 0 1 0 |
| 9   | 0 0 0 0 1 0 0 1 1 |
| 10  | 0 0 0 0 1 0 1 0 0 |
| ⋮ | ⋮ |

FIG. 9

(1) $[X_i' - \langle X_{i-1} \rangle] = 0$
CODE SYSTEM = 1/2/3/4/5/10
CODE STRUCTURE

```
            1
          0 1
        0 0 1
      0 0 0 1
    0 0 0 0 1
0 0 0 0 0 0 0 0 0
0 0 0 0 0 0 0 0 1
0 0 0 0 0 0 0 1 0
0 0 0 0 0 0 0 1 1
            ⋮
```

(3) $[X_i' - \langle X_{i-1} \rangle] = 5$
CODE SYSTEM = 3/8
CODE STRUCTURE

```
0 0 1
0 1 0
0 1 1
1 0 0
1 0 1
1 1 0
1 1 1
0 0 0 0 0 0 0 0
0 0 0 0 0 0 0 1
0 0 0 0 0 0 1 0
        ⋮
```

(2) $[X_i' - \langle X_{i-1} \rangle] = 2$
CODE SYSTEM = 2/4/9
CODE STRUCTURE

```
0 1
1 0
1 1
      0 0 0 1
      0 0 1 0
      0 0 1 1
0 0 0 0 0 0 0 0
0 0 0 0 0 0 0 1
0 0 0 0 0 0 1 0
0 0 0 0 0 0 1 1
        ⋮
```

(4) $[X_i' - \langle X_{i-1} \rangle] = 10$
CODE SYSTEM = 4/11
CODE STRUCTURE

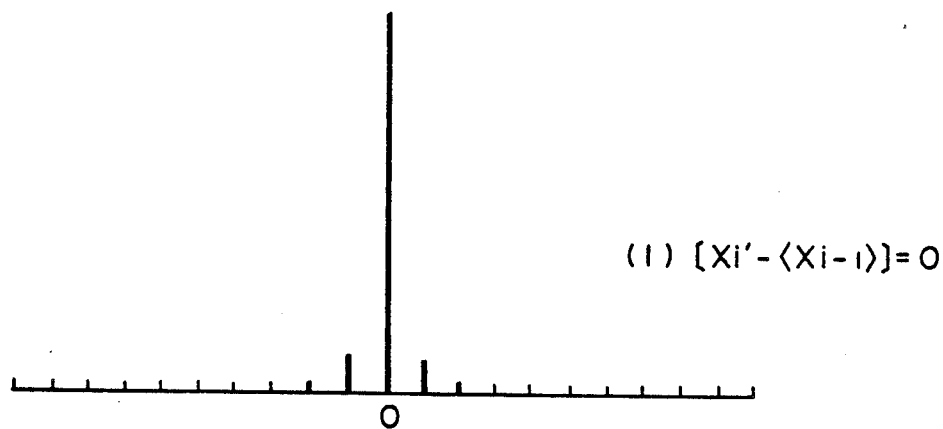
(1) $[X_i' - \langle X_{i-1} \rangle] = 0$
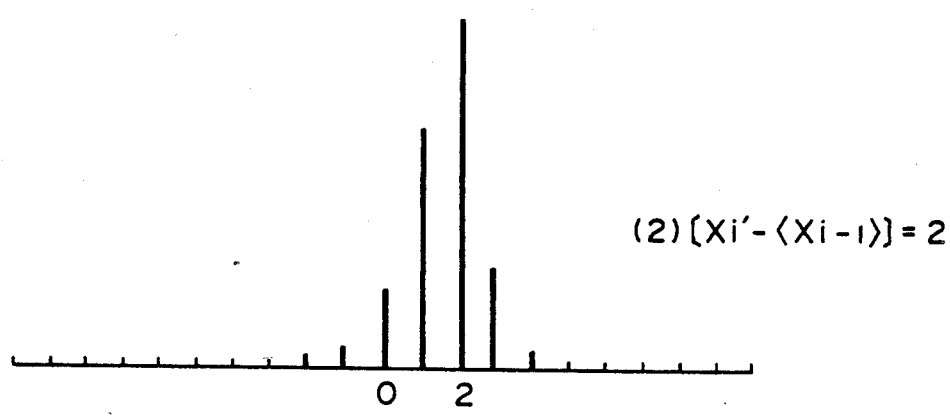
(2) $[X_i' - \langle X_{i-1} \rangle] = 2$
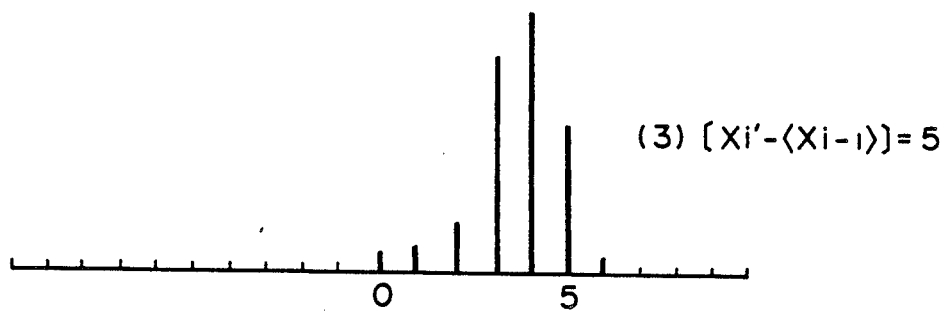
(3) $[X_i' - \langle X_{i-1} \rangle] = 5$
FIG. 12

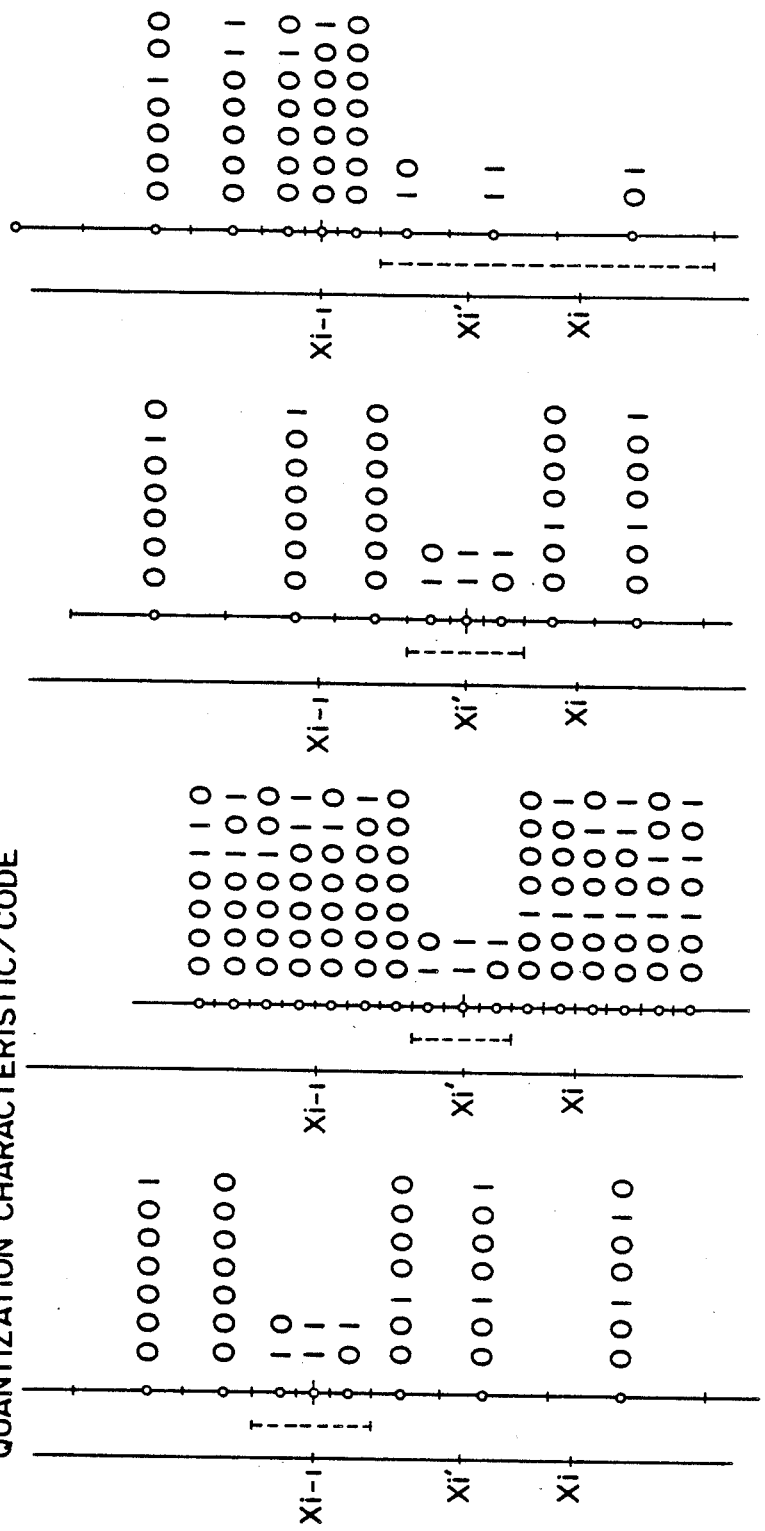

$[C_i - \langle C_{i-1} \rangle] = (0, 0)$

FREQUENCY DISTRIBUTION OF $[C_i - \langle C_{i-1} \rangle]$ $[C_i - \langle C_{i-1} \rangle] = (-1, 0)$ FREQUENCY DISTRIBUTION OF $[C_i - \langle C_{i-1} \rangle]$ $\{C_i - \langle C_{i-1}\rangle\} = (1,1)$
FREQUENCY DISTRIBUTION
OF $\{C_i - \langle C_{i-1}\rangle\}$ $\{C_i - \langle C_{i-1}\rangle\} = (2,2)$
FREQUENCY DISTRIBUTION
OF $\{C_i - \langle C_{i-1}\rangle\}$

ENCODING APPARATUS FOR COMPRESSING AND OUTPUTTING IMAGE DATA

This application is a continuation of application Ser. No. 07/374,627, filed June 30, 1989, which is a continuation of application Ser. No. 07/117,959, filed Nov. 9, 1987, both now abandoned.

BACKGROUND OF THE INVENTION

1. Field of the Invention

The present invention relates to an encoding apparatus for compressing and outputting image data.

2. Related Background Art

A system for differential vector or quantization, DPCM, or the like is known as a system for quantizing a differential signal and performing a code assignment to a signal series such as an image signal having a high correlation. The difference between the DPCM and the differential vector quantization relates to the signal to be processed; namely, a one dimensional signal is processed in the DPCM system and a multi-dimensional signal is processed in the differential vector quantization system. Their essential points are the same. Therefore, the DPCM is, considered to be a kind of differential vector quantization for one dimensional signals.

The DPCM system is well known as a system for compressing and transmitting the digitized image data. According to this system, a differential signal which is obtained by subtracting a prediction signal from the input signal is quantized and encoded by assigning a variable length code or the like and thereafter, the encoded signals are transmitted.

It is a general way to use a preliminary pixel value as a prediction value. However, there has been proposed a method whereby the preliminary pixel value is not used as the prediction value, but instead a two-dimensional prediction is performed on the basis of the pixel values which have already been quantized, or a prediction is executed using a predicting function of a high order of one or more degrees, thereby quantizing the predicted error, i.e., the difference. For example, since the image signal has a high two-dimensional correlation, there have been proposed various kinds of two-dimensional predicting methods whereby in the case where, for example, as shown in FIG. 1, pixels C, E, and D are arranged in that order in sequence in the horizontal direction and pixels $X_{i-1}$ and $x_i$ are arranged under those pixels, the following signals are used as prediction signals $x_i'$ for encoding the pixel $x_i$:

$$x_i' = x_{i-1} + (E-C)/2 \quad (1)$$

$$x_i' = (x_{i-1} + D)/2 \quad (2)$$

$$x_i' = x_{i-1} + E - C \quad (3)$$

$$x_i' = x_{i-1} + (E-D)/2 \quad (4)$$

FIG. 2 shows distributions of the predicted errors, namely, the differences with the predicted values in the cases where the preliminary pixel value is used as a predicted value and where the two-dimensional prediction is performed. Since the predicted error caused by the two-dimensional prediction is smaller as a whole, the average word length can be reduced by assigning short codes to many pixels.

According to the conventional DPCM system using the two-dimensional prediction, in general, the predicted error is quantized by a linear quantization characteristic as shown in (1) in FIG. 3, and the variable-length codes are assigned using the representative value, as a central value, when the predicted error is zero as shown in (2) in FIG. 3.

In FIG. 3, an axis of abscissa denotes a predicted error and an axis of ordinate represents a quantization representative value. The symbols $<>$ are used to represent the quantized value.

As numbers of quantization representative values, the numbers are symmetrically written with respect to the positive and negative values as shown in FIG. 3 by use of the quantization representative value=0 as a central value. The symbols [] are used to represent the number of quantization representative value.

When attention is paid to the relative relation between the two-dimensional prediction value and the preliminary pixel, the predicted error distribution in the preliminary value prediction has a characteristic distribution. This point will be practically explained with reference to the drawings. In FIG. 2, since $x_{i-1}$ is the value which has already been quantized, it is set to $<x_{i-1}>$. With respect to the differential value $x_i - <x_{i-1}>$ and the two-dimensional prediction value $x_i'$, the quantization representative value, numbers which are obtained when $x_1' - <x_{i-1}>$ has been linearly quantized are set to $[x_i - <x_{i-1}>]$ and $[x_i' - <x_{i-1}>]$, respectively. The frequency distributions of $[x_i - <x_{i-1}>]$ when $[x_i' - <x_{i-1}>]$ is equal to 0, 2, 5, and 10 are as shown in (1), (2), (3), and (4) in FIG. 4, respectively. In this case, the two-dimensional prediction system based on the equation (2) is used.

In FIG. 4, when $[x_i' - <x_{i-1}>] = 0$ in (1), $[x_i - <x_{i-1}>]$ has the distribution which is extremely concentrated to zero and is symmetrical in the right and left directions with respect to the representative value of 0. When $[x_i' - <x_{i-1}>] = 2$ in (2), $[x_i - <x_{i-1}>]$ has the distribution which has the peak value of 2 but is not symmetrical with respect to the representative value of 2 and is one-sided toward the representative value of 0. When $[x_i' - <x_{i-1}>] = 5$ in (3), $[x_i - <x_{i-1}>]$ has the distribution which does not have the peak at the representative value of 5 and is one-sided toward the representative value of 0. When $[x_i' - <x_{i-1}>] = 10$ in (4), the distribution is fairly dispersed and has the peak at zero. In the foregoing examples, cases where $[x_i' - <x_{i-1}>]$ is zero or more have been shown as the examples. However, in the cases of the negative values, the distributions which are obtained by reversing the positive values in the distributions in FIG. 4 into the negative values are provided.

As will be obvious from the above explanation, $[x_i - <x_i>]$ does not always present the symmetrical distribution having the peak at the value of $[x_i' - <x_i>]$ but provides the characteristic unique distribution in dependence on the value of $[x_i' - <x_i>]$, in other words, the relative relation between $x_i'$ and $<x_{i-1}>$.

Obviously, the fact shown in FIG. 4 is not contradictory with the conventional fact. Namely, when the correlations between $x_i$ and $x_i'$ are examined with regard to all of the values of $[x_i' - <x_{i-1}>]$, the frequency distribution which has the peak at $x_i - x_i' = 0$ and is symmetrical with respect to the positive and negative values is derived as shown in (2) in FIG. 2.

The conventional code assignment will now be studied on the basis of the foregoing fact. When codes have been assigned on the basis of the distribution (2) in FIG.

2, the code length assignments to the distributions in FIG. 4 are performed on the basis of the value of $[x_i' - <x_i>]$ as a central value as shown in FIG. 5.

When considering the distribution of $[x_i - <x_{i-1}>]$, this code length assignment is improper.

On the other hand, as a visual characteristic of a human being, there is known what is called a masking phenomenon such that in the portion where an image changes greatly, even if a slight error occurs in the image, this error is hardly sensed by the naked eye. For example, this masking phenomenon occurs in the contour portion where an image in a still image or animation image spatially changes or in the portion where an animation image changes with the lapse of time. In the conventional DPCM system, a method whereby the difference with the preliminary value prediction value is non-linearly quantized by use of the masking phenomenon as shown in FIG. 6 is known. Namely, since the image greatly changes in the area having a large difference value, a wide quantization range can be provided for the representative value.

However, according to the conventional DPCM system by the two-dimensional prediction, the non-linear quantization characteristic in consideration of the foregoing visual characteristic cannot be properly set. Therefore, the linear quantization is merely performed or the non-linear quantization is merely executed irrespective of the visual characteristic. In the DPCM of the two-dimensional prediction by the conventional linear quantization, a large compression factor cannot be expected. In addition, the execution of the non-linear quantization which does not consider the visual characteristic results in a deterioration in image quality.

SUMMARY OF THE INVENTION

It is an object of the present invention to eliminate the foregoing problems.

Another object of the invention is to provide an encoding apparatus having a good encoding efficiency.

Still another object of the invention is to provide an encoding apparatus in which a quantization error hardly occurs and the deterioration in image quality due to the encoding is small.

Under such objects, as one embodiment according to the invention, there is provided an encoding apparatus for compressing and outputting image data by performing the prediction differential encoding processes to the image data, wherein this encoding apparatus comprises:

first differential data forming means for receiving image data and forming and outputting first differential data which is equal to the difference between the input image data and first prediction data;

first quantizing means for quantizing the first differential data which is output from the first differential data forming means and forming first quantization differential data;

first prediction data forming means for forming first prediction data by use of the first quantization differential data formed by the first quantizing means;

second prediction data forming means for forming and outputting second prediction data by use of the first prediction data formed by the first prediction data forming means;

second differential data forming means for forming and outputting second differential data which is equal to the difference between the first prediction data which is output from the first prediction data forming means and the second prediction data which is output from the second prediction data forming means;

second quantizing means for quantizing the second differential data which is output from the second differential data forming means and forming second quantization differential data; and variable length encoding means for receiving the first quantization differential data and the second quantization differential data, for determining the assignment of a code length corresponding to the first quantization differential data in accordance with the second quantization differential data, and for further determining and outputting code word train in accordance with the first quantization differential data.

The above and other objects and features of the present invention will become apparent from the following detailed description and the appended claims with reference to the accompanying drawings.

BRIEF DESCRIPTION OF THE DRAWINGS

FIG. 1 is a pixel arrangement diagram for explaining the two-dimensional prediction;

FIG. 2 is a diagram showing the prediction probabilities of the preliminary prediction (1) and the two-dimensional prediction (2);

FIGS. 8 and 9 are diagrams showing the code assignment of the differential representative values in the transmitting/receiving systems shown in FIG. 7;

FIG. 11 is diagrams showing examples of the actual code structures in FIGS. 10(1) to 10(4);

FIG. 12 is distribution diagrams of the differential signals showing the correlations between the differential signal which was non-linearly quantized and the differential signal of the signal which was two-dimensionally predicted;

FIG. 14 is diagrams showing the conventional code assignment;

FIG. 15 is a diagram showing an example of the code assignment in the second embodiment of the invention;

DETAILED DESCRIPTION OF THE PREFERRED EMBODIMENTS

Figure 7:
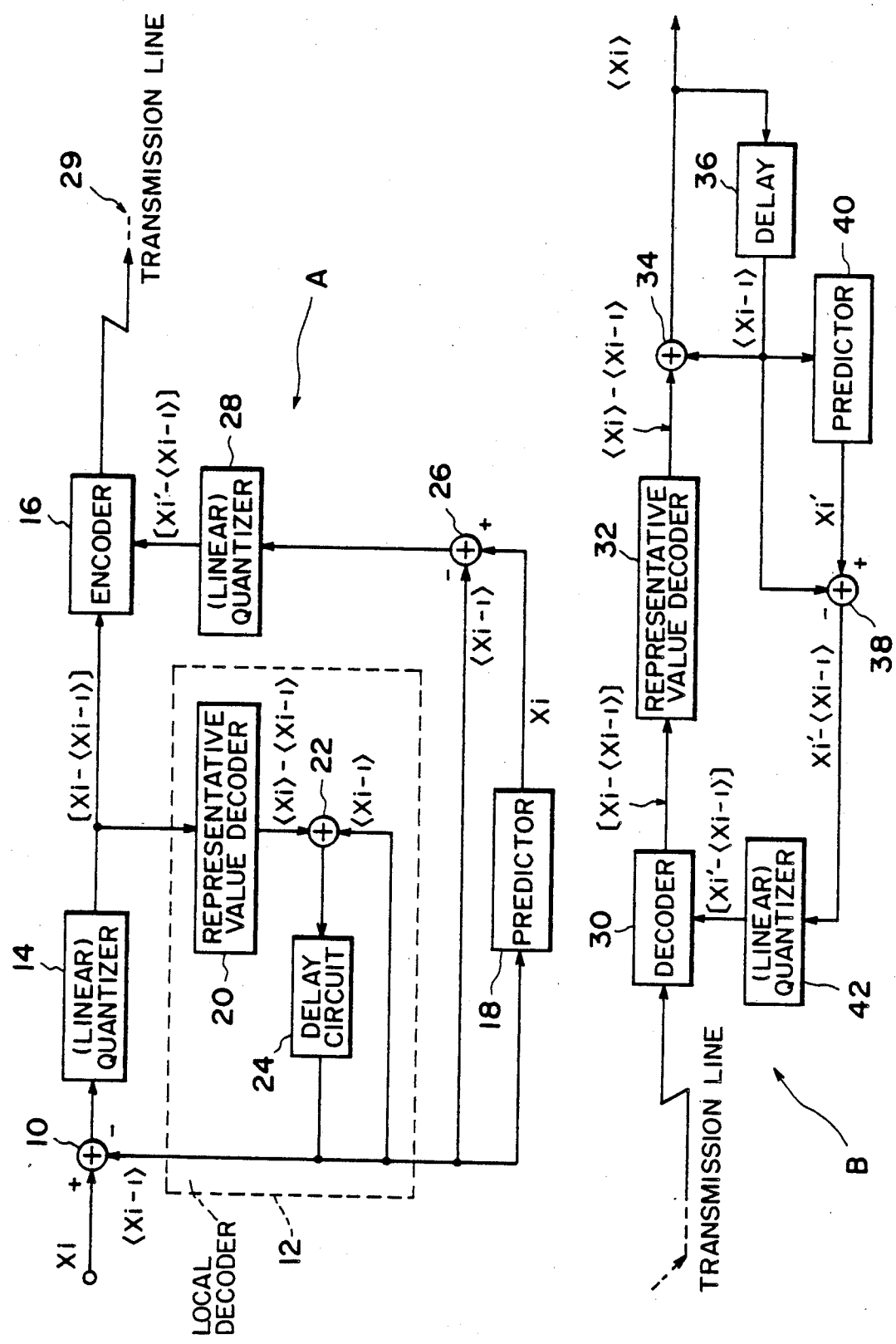
FIG. 7 is a constitutional diagram of transmitting-/receiving systems in a DPCM system according to the present invention as the first embodiment of the invention.

An embodiment of the present invention will be described hereinbelow with reference to the drawings. FIG. 7 shows a constitutional block diagram of transmitting/receiving systems for embodying a DPCM system according to the invention as the first embodiment of the invention. In a transmitting system A in FIG. 7, an adder/subtracter 10 calculates the difference between a sampled input signal $x_i$ and a preliminary pixel value $<x_{i-1}>$ which is output from a local decoder 12. A linear quantizer 14 quantizes an output of the adder/subtracter 10 and outputs a differential representative value $[x_i - <x_{i-1}>]$ to an encoder 16. The encoder 16 assigns the codes to the differential representative value $[x_i - <x_{i-1}>]$ obtained from the quantizer 14 in accordance with the table shown in FIG. 8 and the table shown in FIG. 9 for the code assignment depending on a prediction value $x_i'$ which is obtained from a predictor 18. Then, the encoder 16 sends the code assigned differential representative value to a transmission line 29.

Figure 5:
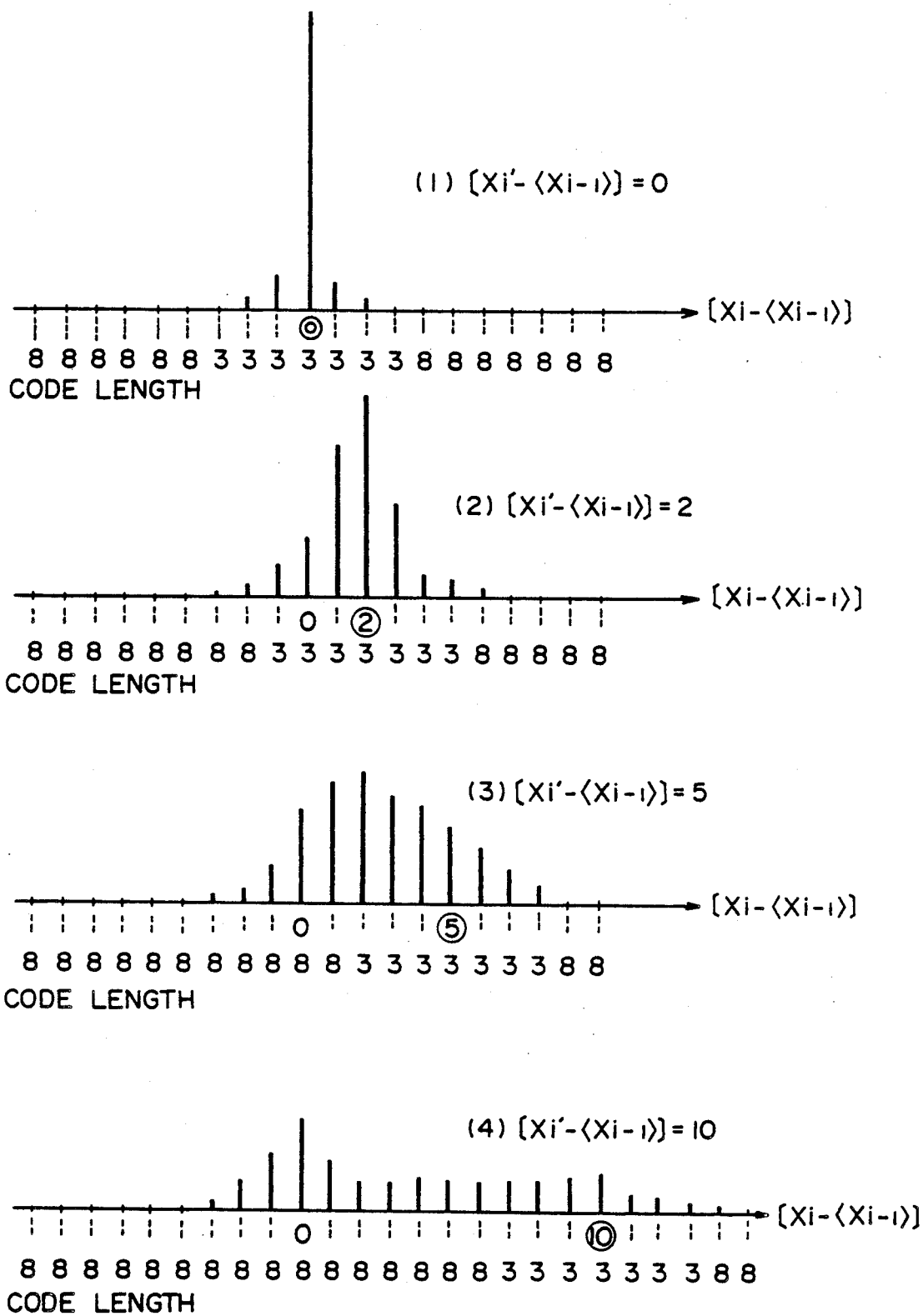
FIG. 5 shows diagrams showing the code length assignment which has conventionally been performed for the differential distributions in FIGS. 4(1) to 4(4)
Figure 6:
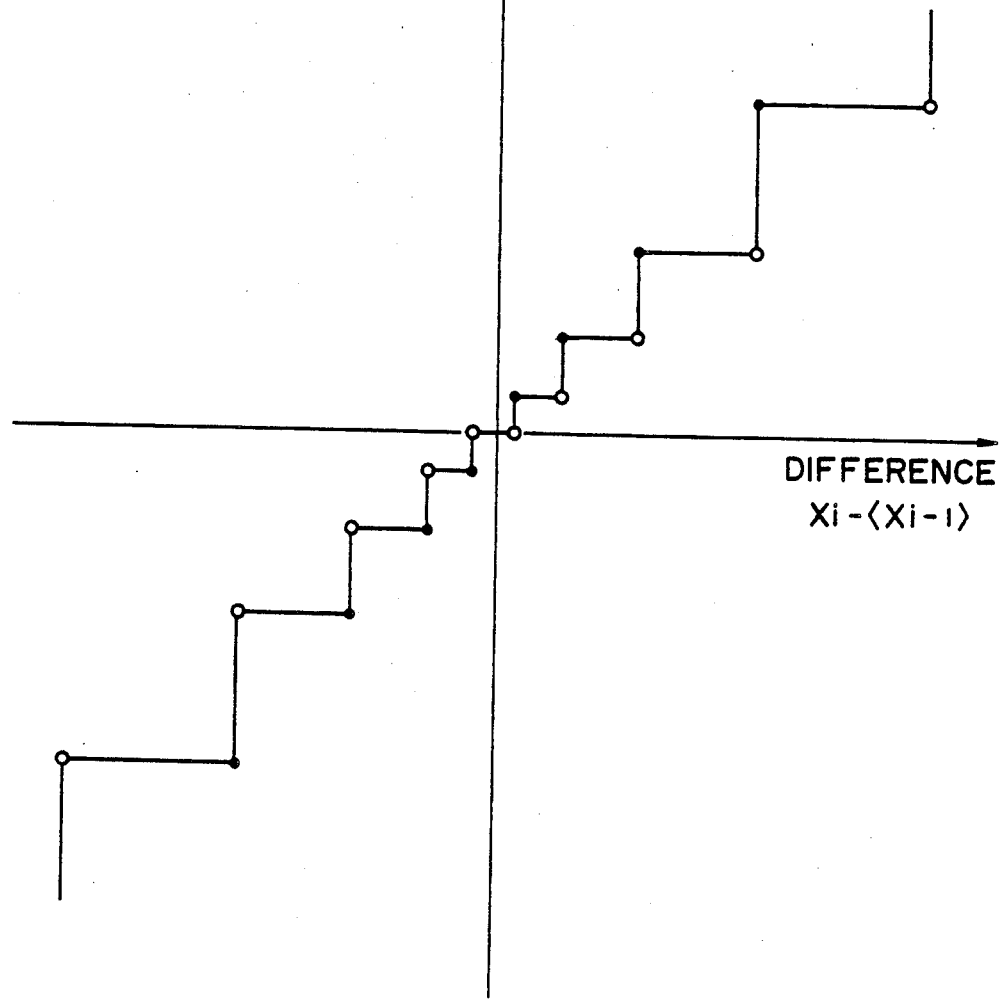
FIG. 6 is a diagram showing an example of the non-linear quantization of the differential signal.
Figure 10:
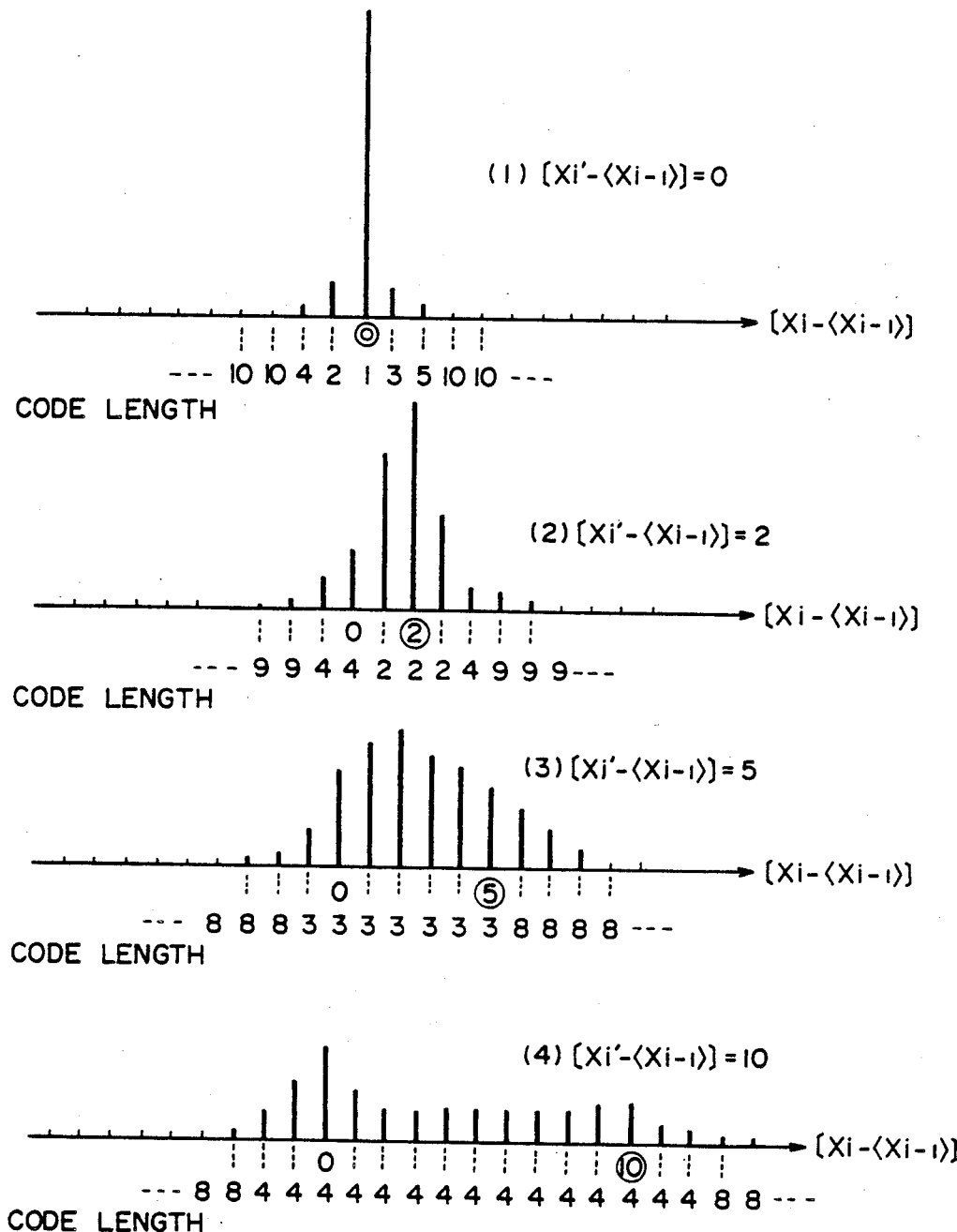
FIG. 10 is diagrams showing examples of the code assignments according to the invention to the differential distributions in FIGS. 4(1) to 4(4)

For the frequency distributions of $[x_i - <x_{i-1}>]$ shown in FIGS. 5(1) to 5(4), the code length assignments as shown in FIGS. 10(1) to 10(4) are executed in this embodiment. The codes which are actually used are similar to the Huffman type codes as shown in FIG. 11. These codes are shown as examples for convenience of explanation. In the actual processes, the code systems and assignment are performed with respect to all of the possible values of $[x_i' - <x_{i-l}>]$.

Figure 8:
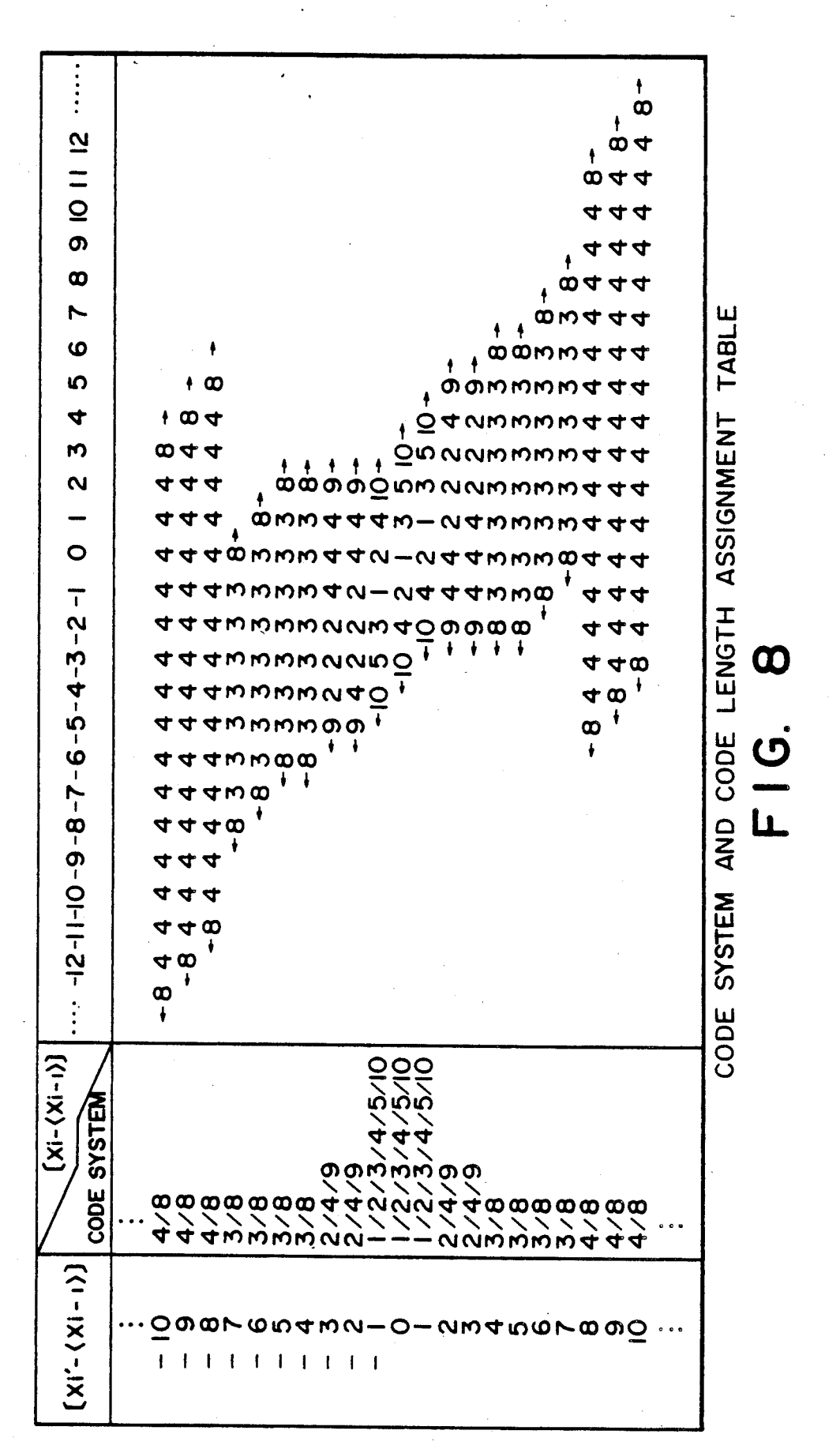

FIG. 8 shows an example. One code systems is selected in accordance with the value of $[x_i' - <x_{i-l}>]$ and the code assignment according to the distribution of $[x_i - <x_{i-1}>]$ is executed. When $[x_i' - <x_{i-1}>] = 2$, the code of 2/4/8 is used and assigned to $[x_i - <x_{i-1}>]$ in accordance with a code table as shown in FIG. 8. Practically speaking, codes as shown in a table of FIG. 9 are used. For example, the code (01) of the code length 2 is assigned to $[x_i - <x_{i-1}>] = 1$.

The selection of the code systems and the code length assignment can be determined with reference to the average data amount of the distribution of $[x_i - <x_{i-1}>]$ and the actual frequency distribution. For example, when $[x_i' - <x_{i-l}>] = 0$ in (1) in FIG. 10, the average data amount of $[x_i - <x_{i-1}>]$ is about 1 bit. Therefore, the code assignment of, for example, 1/2/3/4/5/10 is effective.

In this embodiment, the code assignment can be efficiently performed using the correlation between $[x_i' - <x_{i-}>]$ and $[x_i - <x_{i-l}>]$.

On the other hand, in the local decoder 12, a representative value decoder 20 decodes $<x_i> - <x_{i-1}>$ from $[x_i - <x_{i-1}>]$. An adder 22 adds the preliminary pixel value $<x_{i-1}>$ which is obtained through a delay circuit 24, thereby decoding the pixel value $<x_i>$. The delay circuit 24 delays an output of the adder 22 by one pixel. An output of the delay circuit 24 is supplied to the adder/subtracter 10 and predictor 18 and is also supplied to the minus (−) side of an adder/subtracter 26.

The predictor 18 performs the two-dimensional prediction as explained above or the high order prediction. The circuit having a well-known constitution can be used as the predictor 18 and is not particularly shown here. The prediction value $x_i'$ which is output from the predictor 18 is supplied to the plus (+) side of the adder 26. An output $x_i' - <x_{i-1}>$ of the adder/subtracter 26 is quantized by a quantizer 28 having the same characteristic as that of the quantizer 14. The representative value $[x_i' - <x_{i-l}>]$ corresponding to the differential value $x_i' - <x_{i-1}>$ is output. In the embodiment, as mentioned above, the code systems as shown in the table in FIG. 8 and in the table in FIG. 9 are selected in accordance with the value of $[x_i' - <x_{i-1}>]$ and the codes are assigned to $[x_i - <x_{i-1}>]$. This code assignment is highly efficiently performed by properly using the correlation between $[x_i - <x_{i-1}>]$ and $[x_i' - <x_{i-1}>]$ as mentioned above, so that a high data compression ratio is obtained.

The decoding operation in a receiving system B will now be described with reference to FIG. 7. The DPCM codes transmitted via the transmission line 29 are decoded by a decoder 30. An output of the decoder 30 indicates $[x_i - <x_{i-1}>]$. A representative value decoder 32 decodes this output into $<x_i> - <x_{i-1}>$. An adder 34 adds the numerical value $<x_{i-1}>$ which is obtained from a delay circuit 36 to an output of the decoder 32, thereby reconstructing the image signal $<x_i>$. An output of the adder 34 is applied to the delay circuit 36 to give the delay time corresponding to the unit pixel time. An output $<x_{i-1}>$ of the delay circuit 36 is applied to the adder 34 and the minus (−) side of an adder/subtracter 38 and is also supplied to a predictor 40 having the same characteristic as that in the transmitting system A. An output $x_i'$ of the predictor 40 is applied to the plus (+) side of the adder/subtracter 38. A linear quantizer 42 having the same characteristic as that in the transmitting system A linearly quantizes an output $x_i' - <x_{i-1}>$ of the adder/subtracter 38. The decoder 30 decodes $(x_i' - <x_{i-1}>)$ with reference to the table in FIG. 8 and the table in FIG. 9 on the basis of $[x_i' - x_{i-1}>]$ which is supplied from the quantizer 42 and the DPCM codes which are transmitted via the transmission line. Thus, the decoding corresponding to the encoding in the encoder 16 in the transmitting system A can be performed.

The second embodiment of the invention will now be described hereinbelow.

In the second embodiment, in a manner similar to the explanation of the first embodiment, the differential representative value number which was derived by non-linearly quantizing the difference between the target pixel $x_i$ and the preliminary pixel $<x_{i-1}>$ is expressed by $[x_i - <x_{i-1}>]$ and the differential representative value is expressed by $<x_i - <x_{i-1}>>$.

In the case of using the non-linear quantization, there is also the characteristic correlation between $[x_i - <x_{i-1}>]$ and $[x_i' - <x_{i-1}>]$. This correlation is very stronger than that in the case where the linear quantization was performed in the DPCM system shown in the first embodiment. For example, in the case of using the non-linear quantization for the cases of the linear quantization in FIGS. 4(1) to 4(4) showing the correlation between $[x_i - <x_{i-1}>]$ and $[x_i' - <x_{i-1}>]$. $[x_i - <x_{i-1}>]$ becomes as shown in FIG. 12.

Figure 3:
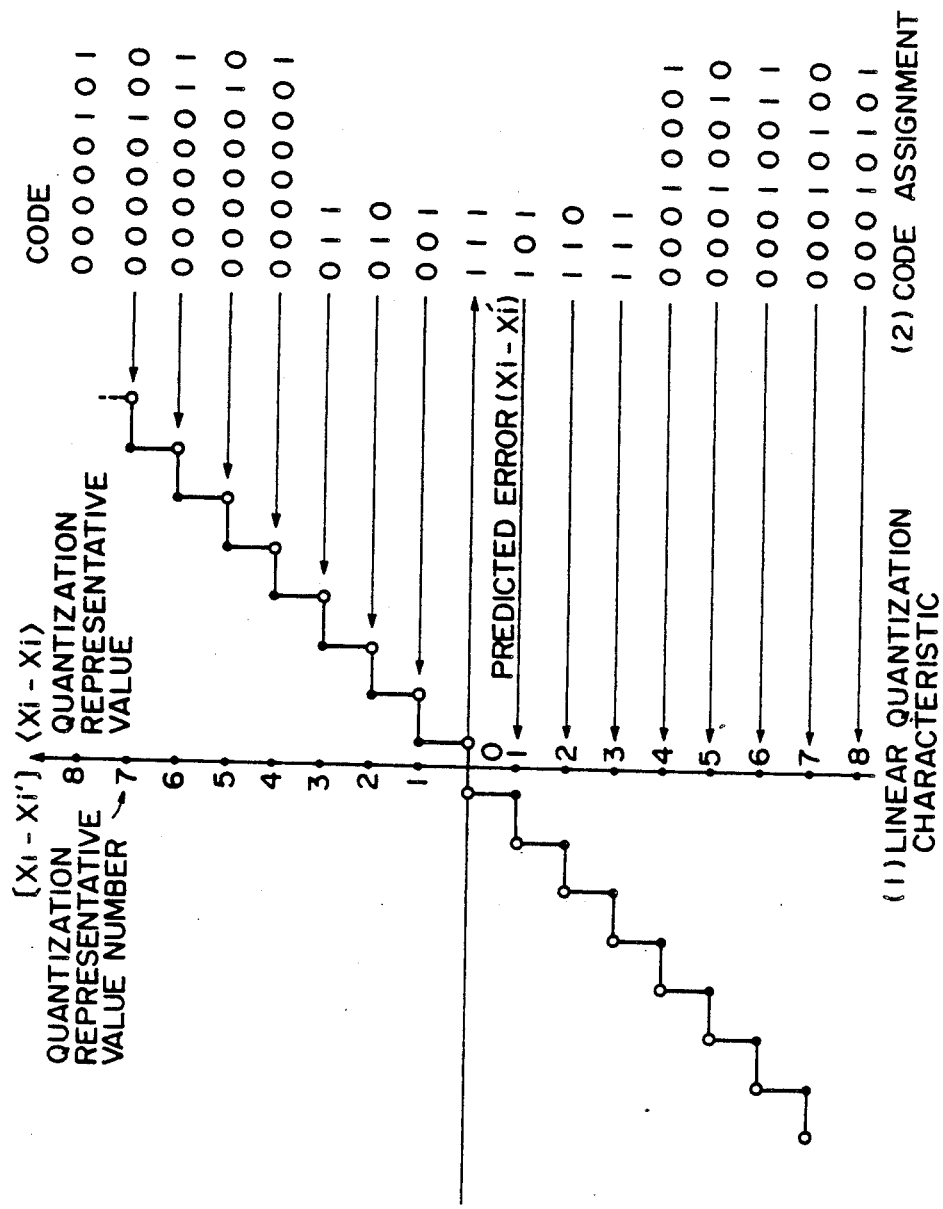
FIG. 3 is a diagram showing examples of the linear quantization (1) of a differential signal and the code assignment (2) to the differential signal which was linearly quantized.
Figure 4:
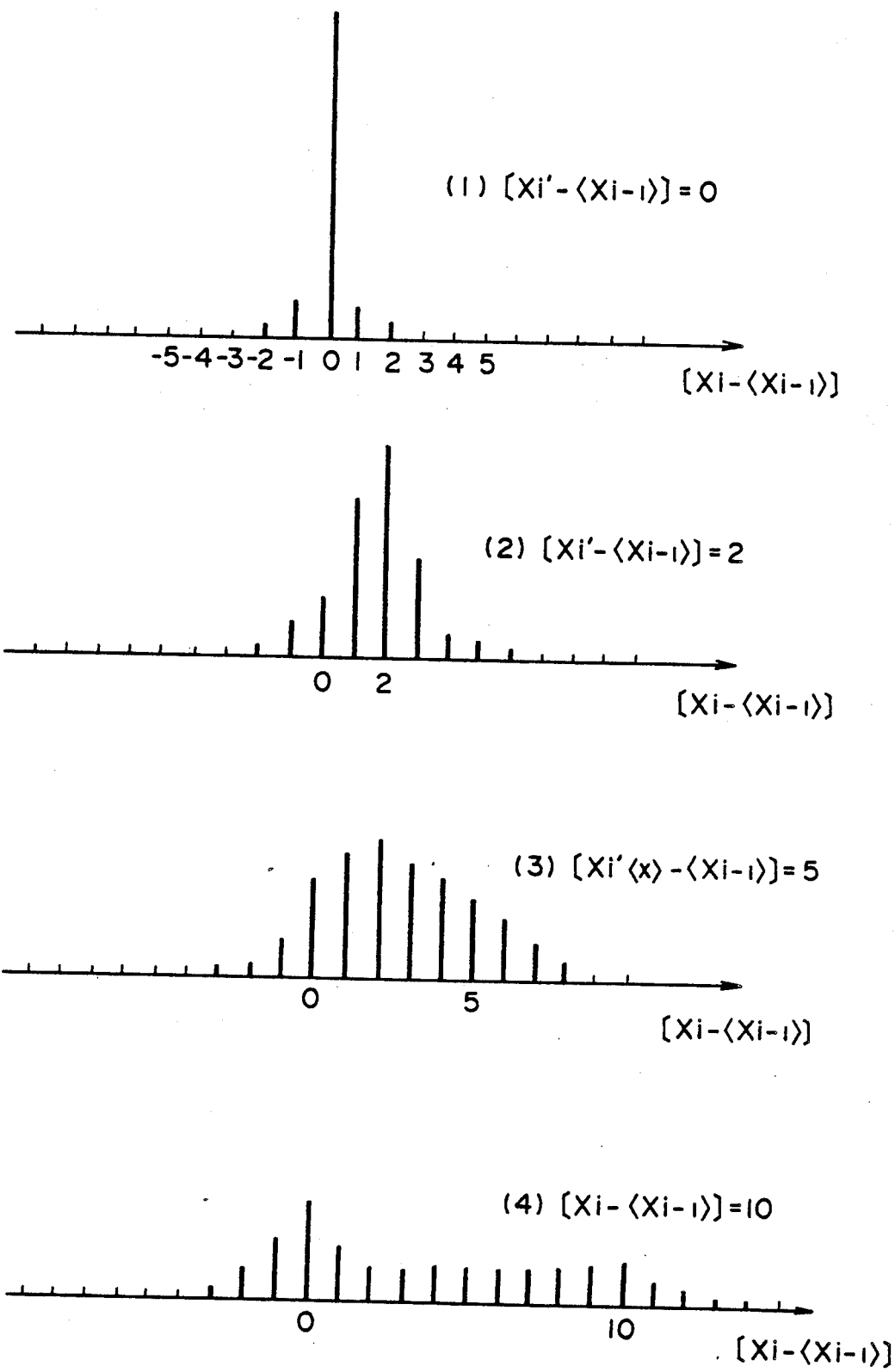
FIG. 4 shows are frequency distribution diagrams of the differential signals showing the correlations between the differential signal which was linearly quantized and the differential signal of signal which was two-dimensionally predicted.

The distributions of $[x_i - <x_{i-1}>]$ in FIGS. 12(1) to 12(3) are the fairly concentrated distributions as compared with those in FIGS. 4(1) to 4(4) and the average data among is reduced.

Figure 13:
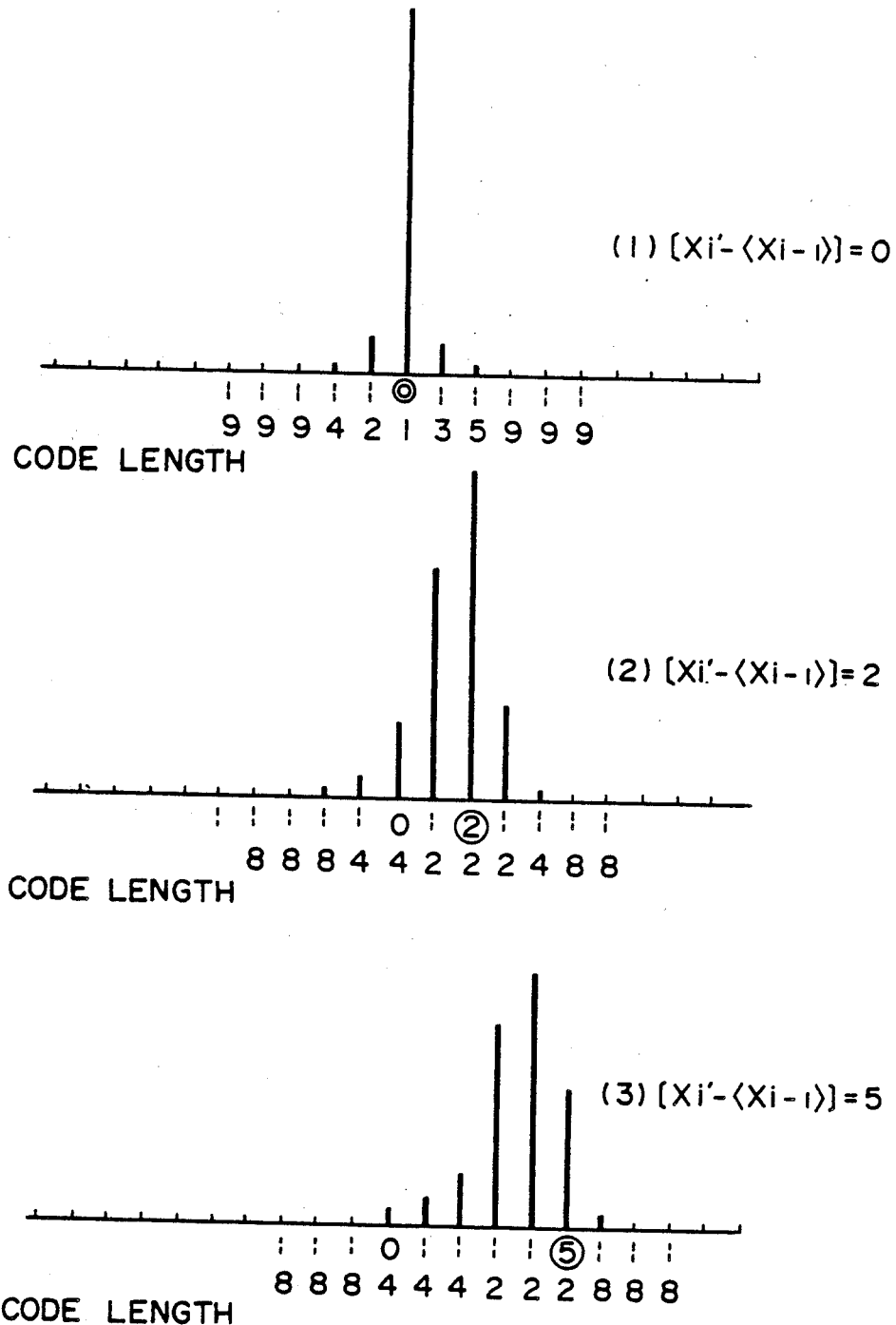
FIG. 13 is diagrams showing examples of the code length assignment in the second embodiment to the differential distributions in FIGS. 12(1) to 12(3)

For example, as shown in FIG. 13, the code length assignment can be performed to the distributions of $[x_i - <x_{i-1}>]$ in FIGS. 12(1) to 12(3) and the shorter codes can be assigned.

The effectiveness which is obtained by the execution of the non-linear quantization shown in the embodiment will now be described in comparison with the conventional example. The following three kinds of conventional quantizing and encoding methods are considered.

1. The non-linear differential quantization is performed and the code having a short word length among the variable length codes is assigned using the preliminary value $x_{i-1}$ as a central value.

2. The predicted error of the two-dimensional or high order prediction value $x_i'$, namely, the difference is linearly quantized and the code having a short word length among the variable length codes is assigned using $x_i'$ as a central value.

3. In the item 2, the predicted error is non-linearly quantized and the code having a short word length among the variable length codes is assigned using $x_i'$ as a central value.

FIGS. 14(1) to 14(3) show the quantization characteristics of those three kinds of quantization and encoding processes, and the code assignments, the assignment ranges of two bits, and the codes for $x_i$ when the 2/7 variable length code was used as the variable length code, respectively.

In the item 1, since the non-linear quantization using the preliminary value $<x_{i-1}>$ as a central value is used, the image quality does not deteriorate as a visual image. In the item 2, since the linear quantization pitch is made fine to a level such that the quantization error cannot be detected, the image quality does not deteriorate as well. However, in the item 3, when the value of $x_i$ is near the preliminary value $x_{i-1}$, if the prediction value $x_i'$ is away from the value of $x_i$, a relatively large quantization error is, given, so that this causes the image quality to deteriorate considerably as a visual image. On the other hand, the width to which two bits are assigned (the width in the vertical direction which is indicated by a broken line in FIG. 14) in the item 1 is the same as that in the item 3. However, in the item 2, two bits can be assigned to only an extremely narrow range, so that the compression efficiency is lower than those in the items 1 and 3.

FIG. 15 shows the quantization and variable length code assignment in the second embodiment corresponding to the foregoing code assignments. In the second embodiment, the difference with the preliminary value prediction value $<x_{i-1}>$ is non-linearly quantized using the preliminary value $<x_{i-1}>$ as a central value. The variable length code is assigned in accordance with the representative value corresponding to the prediction value $x_i'$. FIG. 15 shows the example in which the code of two bits was simply assigned near $x_i'$. In this case, the assignment range of two bits can be set to a wider range than those in the foregoing three items 1 to 3. Since there is a very strong correlation between $x_i'$ and $x_i$, the two-bit code is selected at a high probability in this embodiment and the high compression ratio can be accomplished. In the case of the example shown in the diagram, the code to $x_i$ is (01) of two bits.

In this manner, by performing the non-linear quantization using the preliminary value as a central value and by performing the code assigning using the data of two dimensional prediction values, the code of a short word length can be assigned in a wider range. FIGS. 14(1) to 14(3) and FIG. 15 are shown to compare with the conventional example by use of the 2/7 code in order to explain the effectiveness of the embodiment.

By applying the foregoing non-linear quantization shown in the second embodiment to the encoding transmitting apparatus shown in the first embodiment, the code assignment having a high efficiency can be accomplished by use of the correlation distributions between $[x_i - <x_{i-1}>]$ and $[x_i' - <x_{i-1}>]$ as shown in FIGS. 14(1) to 14(3) and FIG. 15.

The constitution of this embodiment is fundamentally the same as that shown in FIG. 7. However, in FIG. 7, all of the quantizers have the same non-linear characteristic and the encoder 16 and the decoder 30 have the encoding/decoding characteristics according to the characteristics in FIGS. 12(1) to 12(3).

Only the foregoing two points are different. The processing algorithm similar to the DPCM in the encoding transmitting apparatus in the first embodiment can be used.

Although the data compression in the two dimensional space has been described above, the present invention can be also applied to the data compression in the three dimensional space, i.e., in the direction of the time base. Therefore, the invention can be also used in the compression of either the still image data or the animation image data.

On the other hand, in the embodiment described above, as the distributions of the differential values as shown in FIGS. 12(1) to 12(3), the results of the experiments obtained when the prediction system of the equation (2) had been used were shown as the references for explanation. The distribution of the differential value fundamentally strongly depends on the quantizing method and two-dimensional prediction system. Therefore, the code assignments differ in accordance with the quantizing method and two-dimensional prediction system which are used. The code assignment is not limited to the code assignment shown in the embodiment.

The DPCM system can be generally regarded as the simplest system in the differential vector quantization. Namely, the differential vector quantization relates to the method whereby the code assignment is performed to the differential vector of the signal series of a dimensions (n is an arbitrary natural number). In the general DPCM, the differential vector quantization is executed for the one-dimensional signal series.

The differential vector quantization and DPCM of the two-dimensional signal series will now be briefly explained for comparison.

Figure 16:
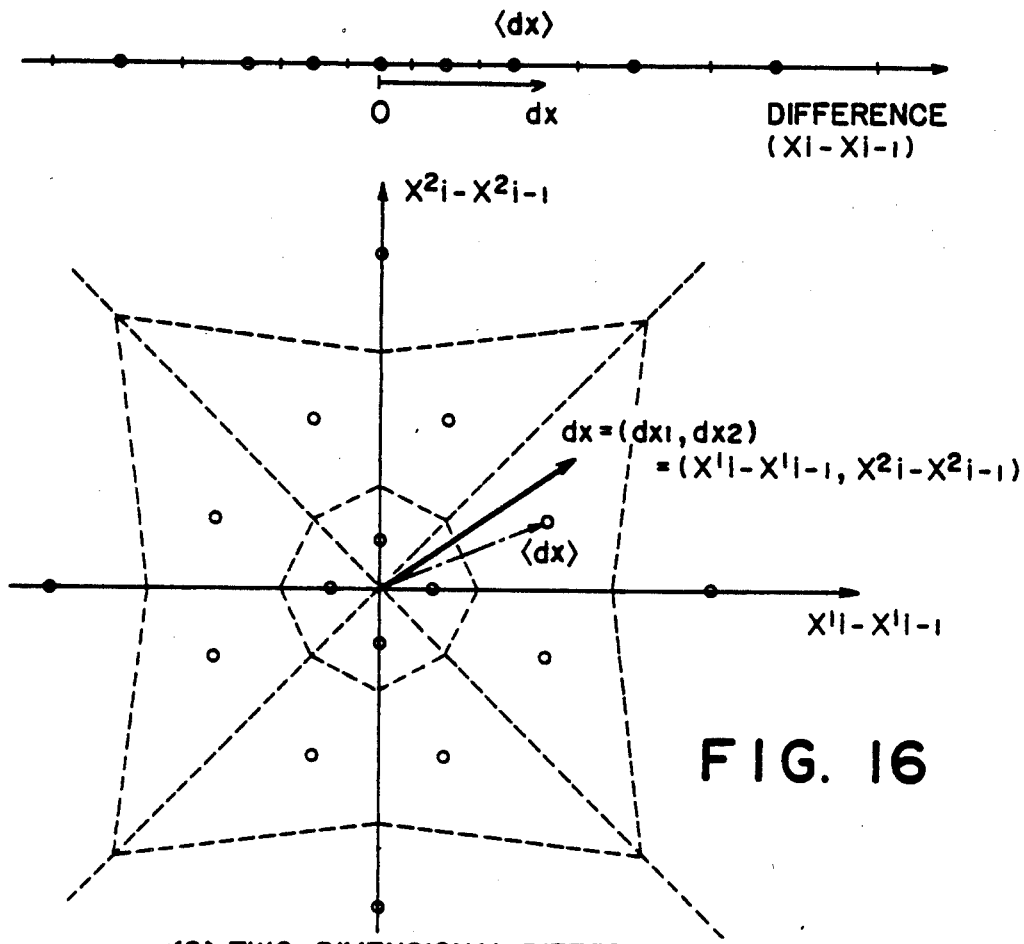
FIG. 16 is a diagram showing examples of the DPCM (1) and the vector quantization (2)

FIGS. 16(1) and 16(2) show examples of the DPCM and the quantizing method by the differential vector quantization, respectively.

In the DPCM of FIG. 16(1), a one-dimensional representation range is provided for the one-dimensional differential vector $dx = x_i - x_{i-1}$. The differential L representative value vector of $<dx>$ is assigned.

In the two-dimensional differential vector quantization of FIG. 16(2), a two-dimensional representation range is provided for the differential vector $x = (dx_1, dx_2) = (x1_i - x1_{i-1}, x2_i - x2_{i-1})$ of the two-dimensional signal series $X_i=(x1_i, x2_i)$. The differential representative vector of $<x>$ is assigned.

The invention is also effective for the differential vector quantization. Namely, in the signal such as an image signal which has the two-dimensionally high correlation, the differential vector $x_i-x_{i-1}$ has the characteristic correlation with the differential vector $x_i'-x_{i-1}$ between the two-dimensional prediction vectors $x_i'$ and $x_{i-1}$. Therefore, the code assignment can be highly efficiently performed for $x_i-x_{i-1}$ in accordance with $x_i'-x_{i-1}$.

The third embodiment of the invention will now be described hereinbelow with respect to the case where the invention is applied to the differential vector quantization. In this case, as a simple example, an explanation will be made with regard to the case where the chrominance components R-Y and B-Y of a color video signal are two-dimensionally vector quantized.

Figure 17:
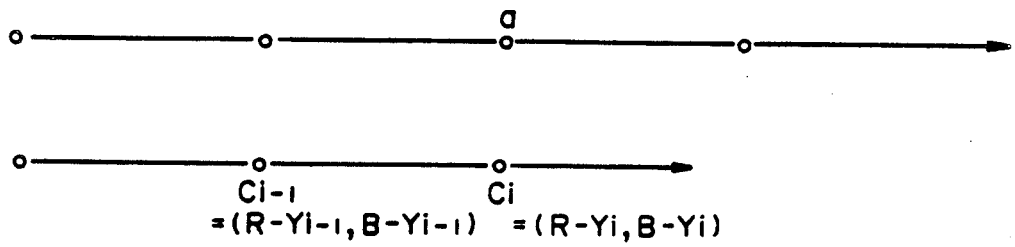
FIG. 17 is a diagram showing a pixel arrangement for explaining the two-dimensional prediction.

The two-dimensional vector sampling series is set to $C_i$ and its components consist of the sampling value series of the color difference components R-Y and B-Y. This series is expressed as shown in FIG. 17.

Figure 18:
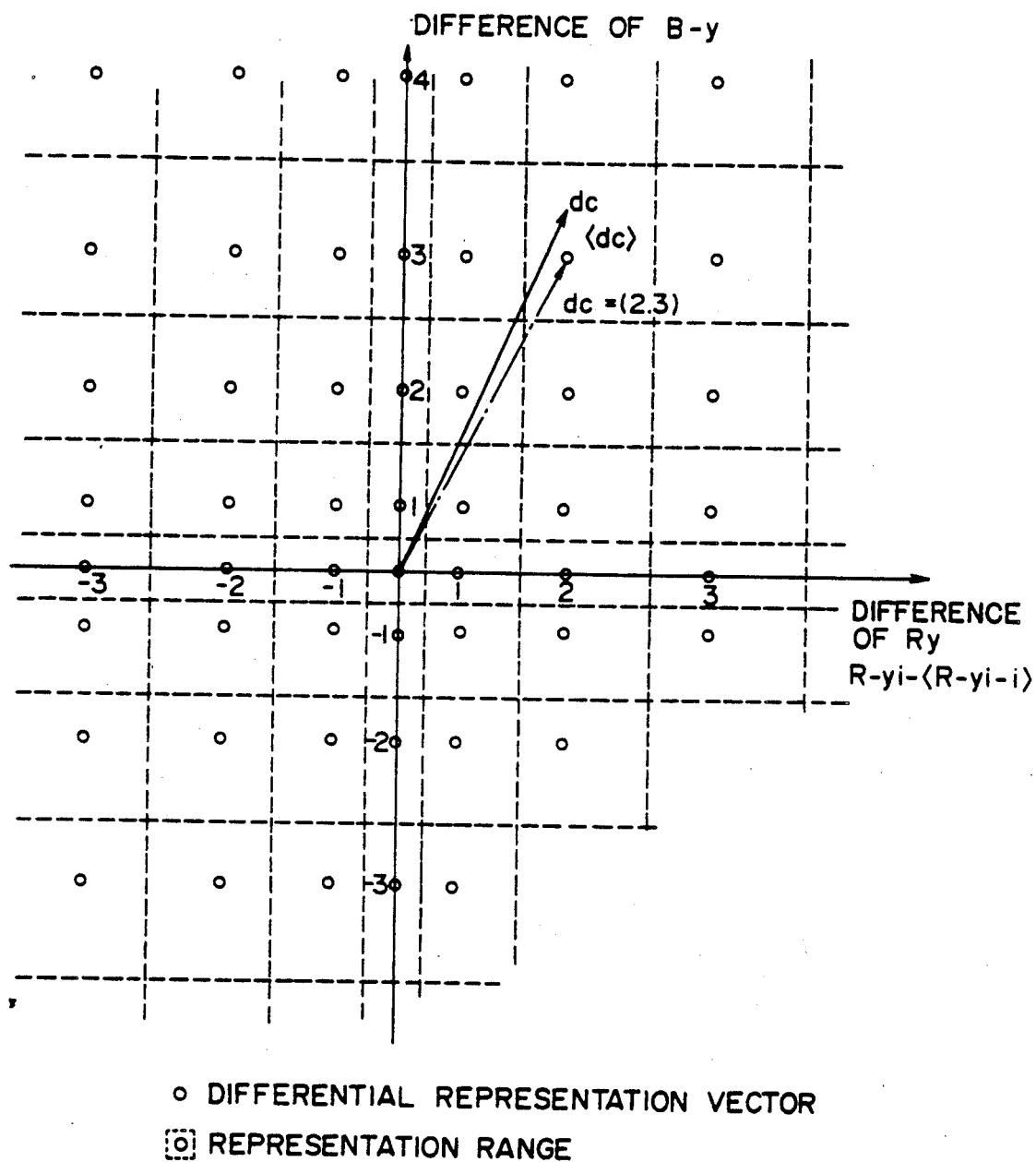
FIG. 18 is a diagram showing an example of the differential vector quantization.
Figure 19A:
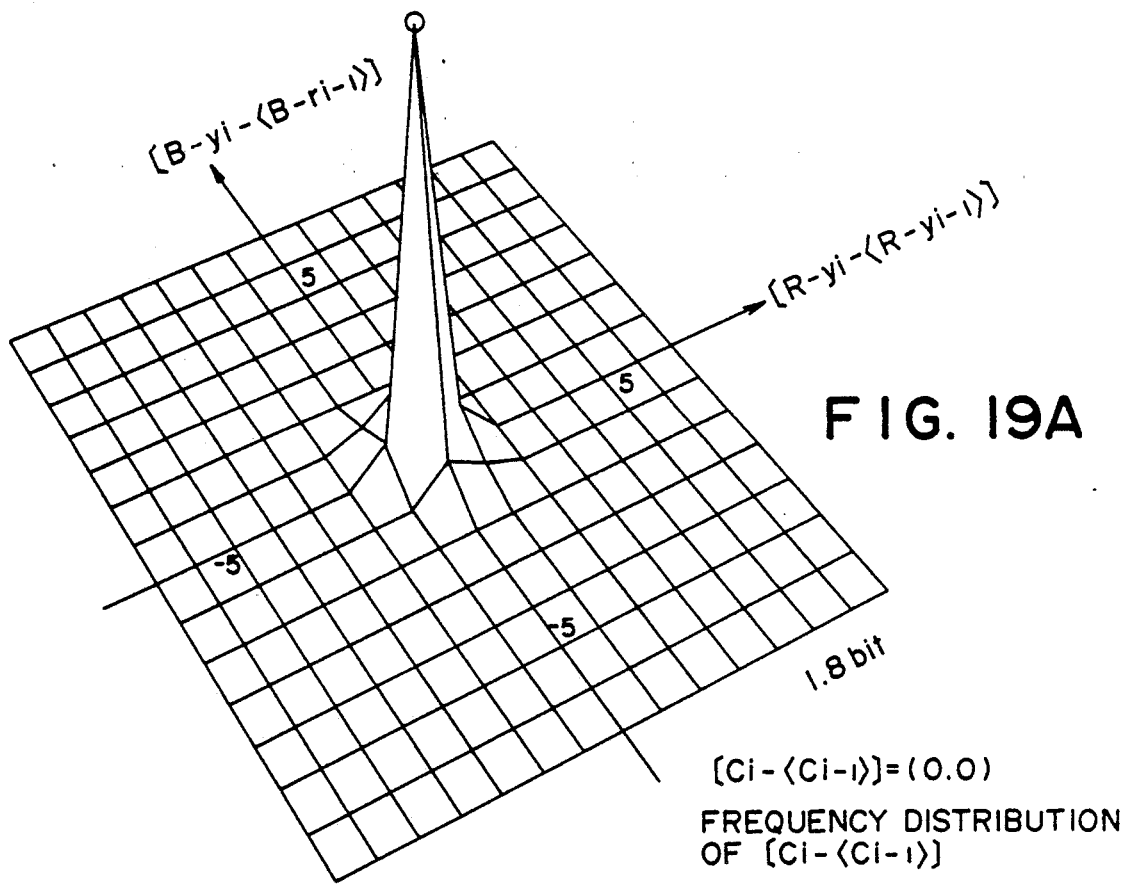
FIGS. 19A to 19D are distribution diagrams of the differential vectors showing the correlations between the differential differential vector signal when the vector quantization in FIG. 18 was performed and the differential vector of the vector which was two dimensionally predicted.
Figure 19B:
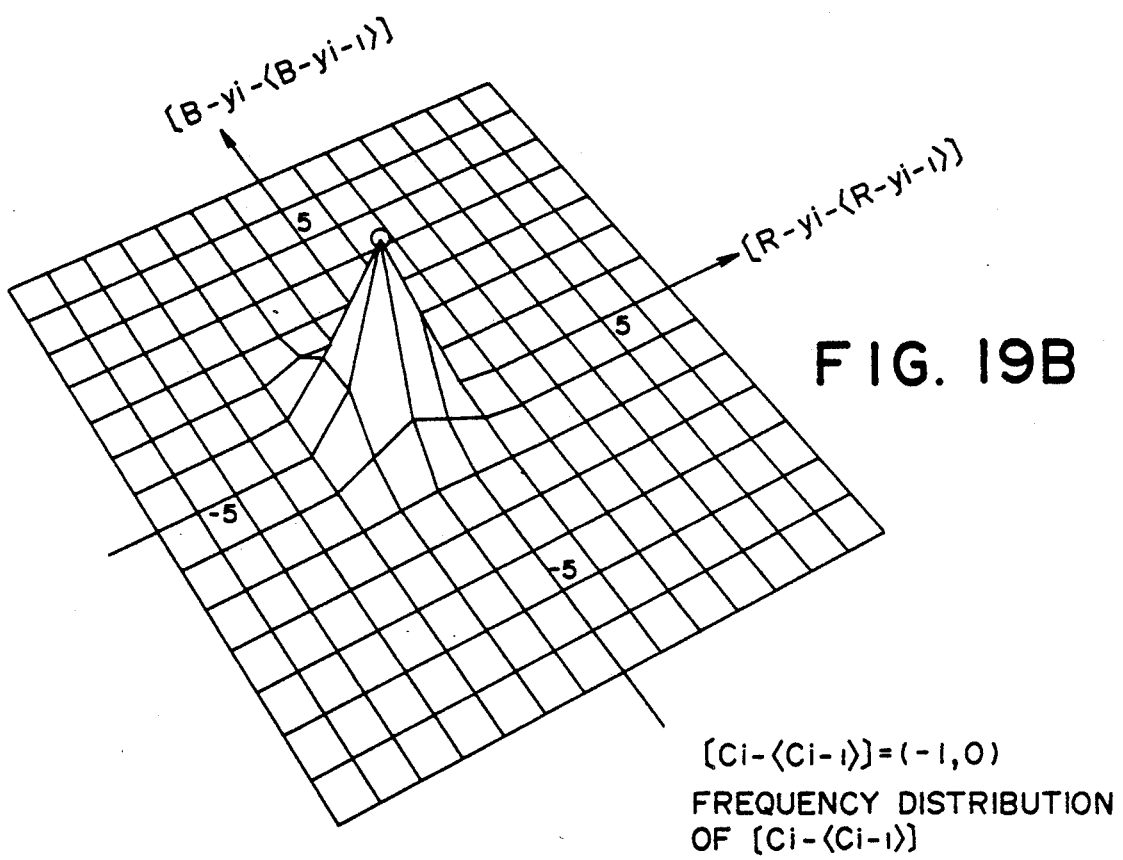
Figure 19C:
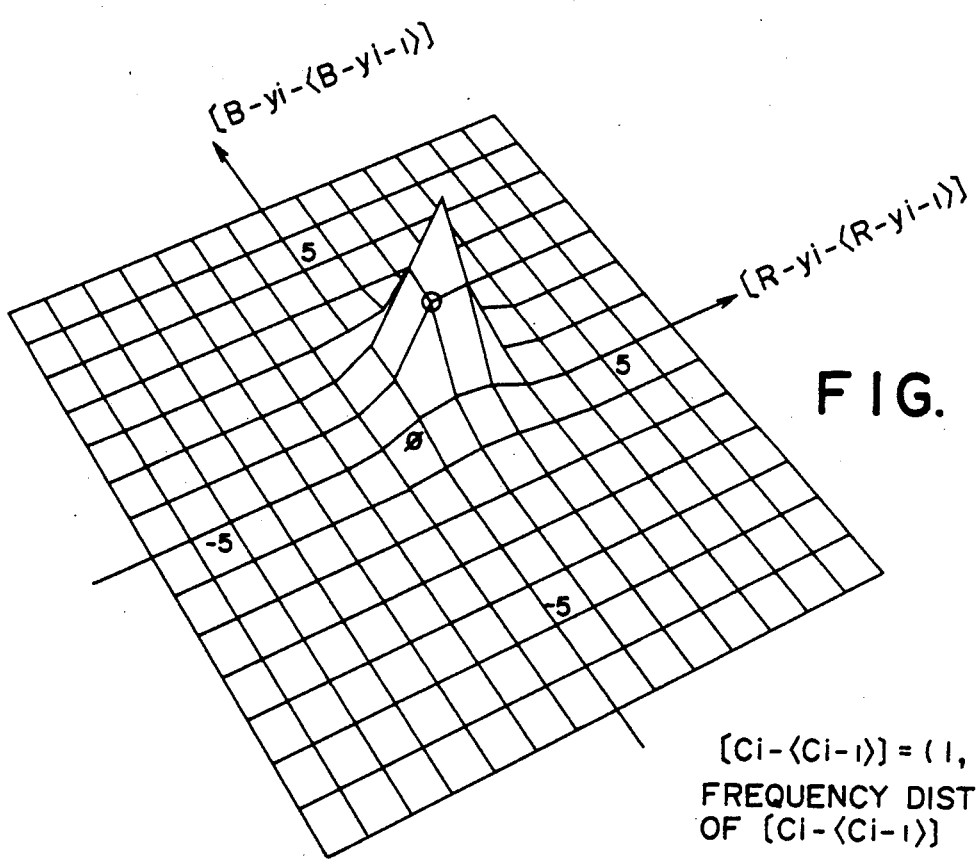
Figure 19D:
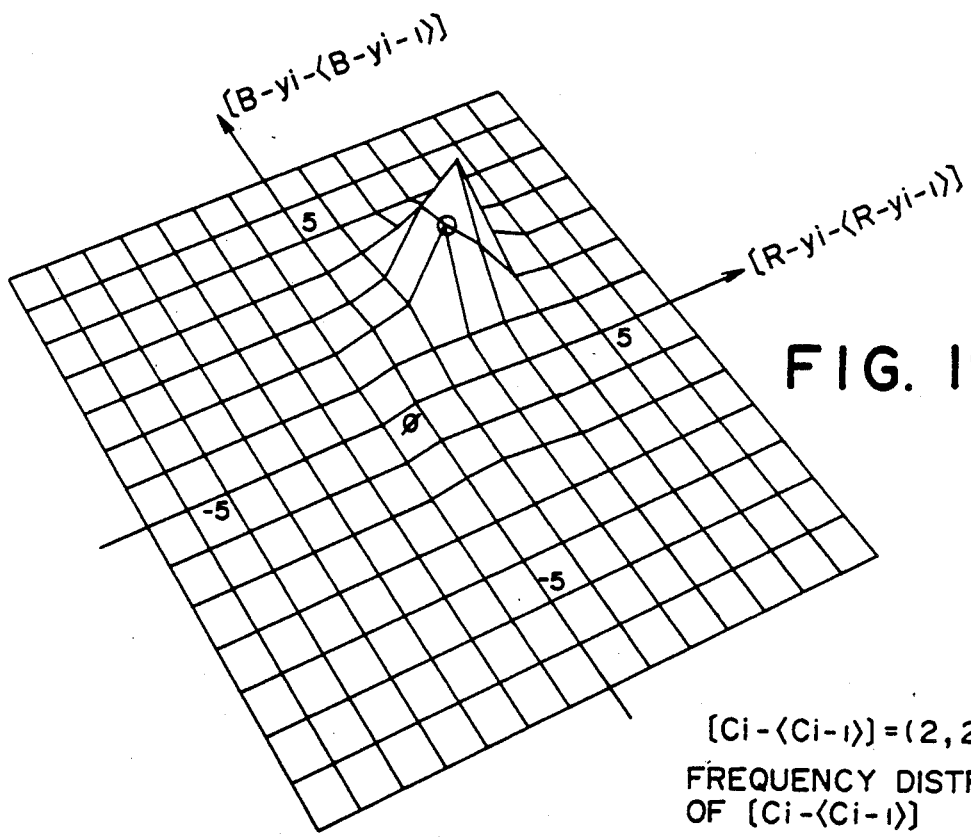

In the differential vector quantization, the characteristic differential vector quantization constitution can be realized as shown in FIG. 16. However, for simplicity of drawing, a vector constitution in which a lattice is provided for each axis on the basis of the non-linear characteristic is used as shown in FIG. 18.

For the differential vector $dC=C_i-<C_{i-1}>$, the representative vector is expressed by $<d\,C>$.

In correspondence to $<d\,C>$, $[d\,C]$ is defined by the representative number of each axis. On the basis of the representative value number of each axis in FIG. 18, $[d\,C]$ is expressed by the vector component format. In the example shown in FIG. 18, $[d\,C]=(2, 3)$.

On the other hand, as an example of the two-dimensional prediction system, in the pixel constitution of FIG. 17, the two-dimensional prediction vector is set to $$C_i' = \frac{(<C_i> + <2>)}{2}.$$

When $[C_i'-<C_{i-1}>]$ is $(0, 0)$, $(-1, 0)$, $(1, 1)$, and $(2, 2)$, the frequency z distributions of $[C_i-<C_{i-1}>]$ become as shown in FIGS. 19A, 19B, 19C, and 19D, respectively.

In FIGS. 19A to 19D, O indicates the position of $[C_i'-<C_{i-1}>]$.

As will be understood from FIGS. 19A to 19D, there is the strong correlation between $[C_i-<C_{i-1}>]$ and $[C_i'-<C_{i-1}>]$. $[C_i-<C_{i-1}>]$ does not always present the distribution having the peak at the point of $[C_i'-<C_{i-1}>]$ as a central value but exhibits the characteristic distribution having different concentration degree in accordance with the case of $[C_i'-<C_{i-1}>]$.

Therefore, the invention in which the code is adaptively assigned to $[C_i-<C_{i-1}>]$ in accordance with $[C_i'-21\,C_{i-1}>]$ is obviously effective.

The vector constitution of FIG. 18 is used to easily understand the illustrations of FIGS. 19A to 19D. The present invention is not limited to this vector constitution but can be also effective in any vector constitution as shown in FIG. 16.

However, if the differential vector quantization system and the prediction system differ, the different code assignments are obviously properly used in accordance with those systems.

On the other hand, even in the differential vector quantization, the effectiveness of the invention which has been mentioned in the DPCM is also obtained. Namely, in the case of an image which largely changes when considering the human visual characteristic, even if a large error was given, it is not detected. Therefore, in general, in the case of the vector having a large differential vector as shown in FIG. 16, the quantization representation space can be made large. Thus, in a manner similar to the DPCM system, by controlling the image quality using the preliminary pixel as a differential reference, the highly efficient code assignment can be performed.

Figure 20:
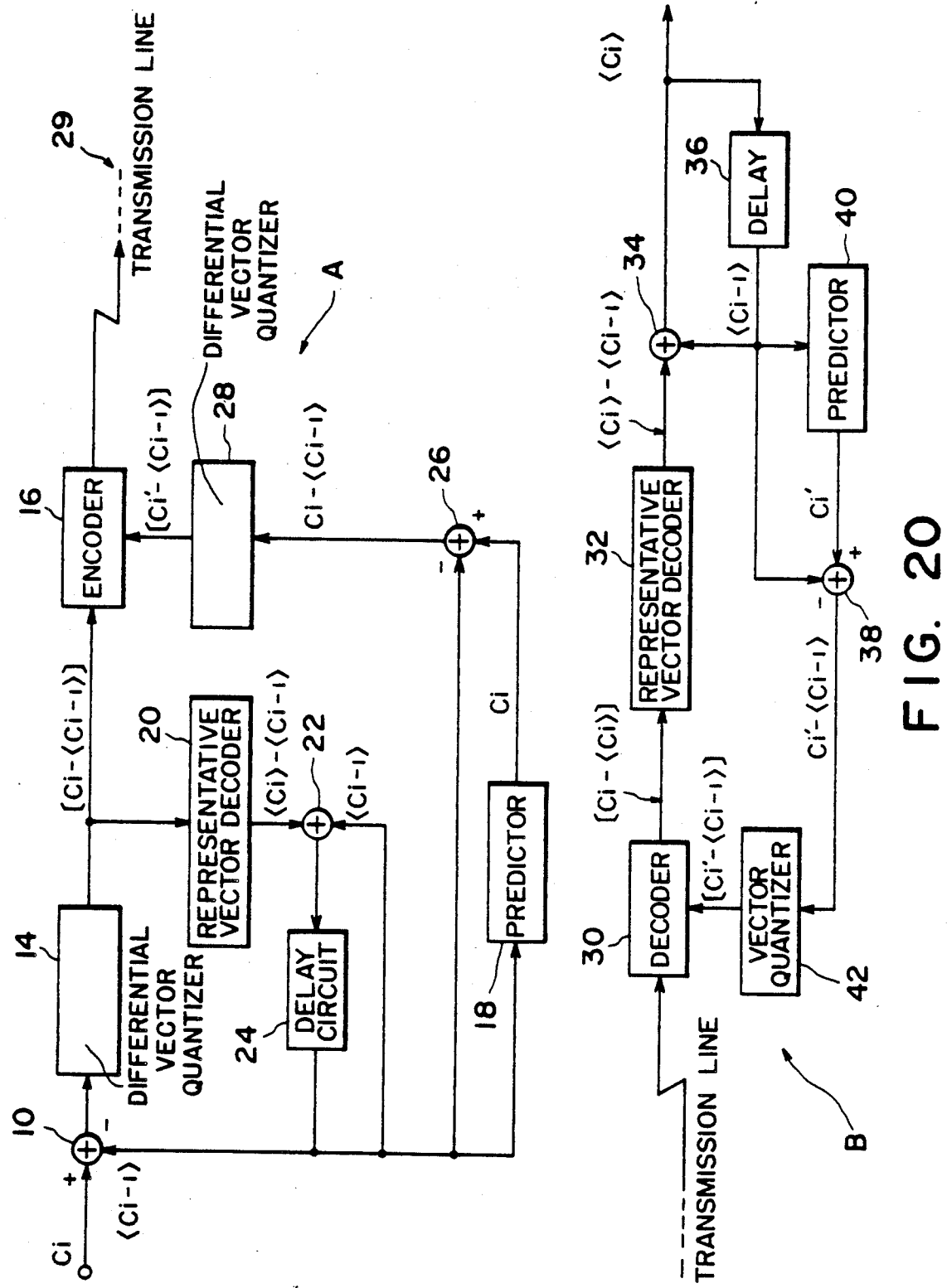
FIG. 20 is a constitutional diagram of transmitting/receiving systems in a differential vector quantization system according to the invention as the third embodiment of the invention.

An embodiment in this case will be as shown in FIG. 20. The contents of the essential processes are similar to those in the case of the DPCM shown in FIG. 7 except that only the vector signal is handled. In this, way, the effective encoding can be performed in the differential vector quantization of arbitrary dimensions.

What is claimed is:

1. An encoding apparatus for compressing and outputting image data by performing prediction differential encoding of the image data, said apparatus comprising:
   (A) first differential data forming means for receiving image data and first prediction data and for forming and outputting first differential data equal to the difference between the image data and the first prediction data;
   (B) first quantizing means for quantizing the first differential data output from said first differential data forming means and for outputting the quantized first differential data as first quantization differential data;
   (C) first prediction data forming means for forming and outputting the first prediction data by use of the first quantization differential data output from said first quantizing means;
   (D) second prediction data forming means for forming and outputting second prediction data by use of the first prediction data output from said first prediction data forming means;
   (E) second differential data forming means for forming and outputting second differential data equal to the difference between the first prediction data output from said first prediction data forming means and the second prediction data output from said second prediction data forming means;
   (F) second quantizing means for quantizing the second differential data output from said second differential data forming means and for outputting the quantized second differential data as second quantization differential data; and
   (G) variable length encoding means for receiving the first quantization differential data and the second quantization differential data, for assigning a code length for the first quuantization differential data in accordance with the second quantizaton differential data, and for outputting a code having the assigned code length in accordance with the first quantization differential data.

2. An encoding apparatus according to claim 1, wherein each of said first and second quantizing means comprises a linear quantizer.

3. An encoding apparatus according to claim 1, wherein each of said first and second quantizing means comprises a non-linear quantizer.

4. An encoding apparatus according to claim 1, wherein said variable length encoding means selects a code system from among a plurality of code systems, each comprising a plurality of kinds of codes, in accordance with the value of the second quantization differential data, and said variable length encoding means outputs a code whose length corresponds to the value of the first quantization differential data in accordance with the selected code system.

5. An encoding apparatus for compressing and outputting image data by performing prediction differential encoding of the image data, said apparatus comprising:
   (A) differential data forming means for receiving image data and first prediction data and for forming and outputting differential data equal to the difference between the image data and the first prediction data;
   (B) quantizing means for quantizing the differential data output from said differential data forming means and for outputting the quantized differential data;
   (C) first prediction data forming means for forming and outputting the first prediction data by use of the quantized differential data output from said quantizing means;
   (D) second prediction data forming means for forming and outputting second prediction data by use of the first prediction data output from said first prediction data forming means; and
   (E) variable-length encoding means for variable-length encoding the quantized differential data output from said quantizing means according to an encoding characteristic controlled according to the first prediction data output from said first prediction data forming means and the second prediction data output from said second prediction data forming means, and for outputting a code corresponding to the variable-length encoded data.

6. An encoding apparatus according to claim 5, wherein said quantizing means comprises a linear quantizer.

7. An encoding apparatus according to claim 5, wherein said quantizing means comprises a non-linear quantizer.

8. An encoding apparatus according to claim 6, wherein said variable-length encoding means has a plurality of different encoding characteristics and is arranged so as to select an encoding characteristic according to the first prediction data and the second prediction data from among said plurality of different encoding characteristics, to variable-length encode the quantized differential data according to the selected encoding characteristic and to output a code corresponding to the variable-length encoded data.

9. A decoding apparatus for decoding a code into image data, said code being produced by variable-length encoding differential data representative of the difference between said image data and first prediction data according to an encoding characteristic which is controlled according to said first prediction data and second prediction data formed by using said first prediction data, said apparatus comprising:
   (A) decoding means for receiving said code, decoding the received code and outputting decoded data;
   (B) decoded image data forming means for forming decoded image data by using the decoded output from said decoding means and third prediction data;
   (C) third prediction data forming means for forming said third prediction data by using the decoded image data formed by said decoded image data forming means;
   (D) fourth prediction data forming means for forming fourth prediction data by using said third prediction data formed by said third prediction data forming means; and
   (E) control means for controlling a decoding characteristic of said decoding means according to said third prediction data forming by said third prediction data forming means and said forth prediction data formed by said fourth prediction data forming means.

10. A decoding apparatus according to claim 9, wherein said decoded image data forming means includes adding means for adding the decoded data output from said decoding means to the third prediction data formed by said third prediction data forming means and for outputting the result of the addition as decoded image data.

11. A decoding apparatus according to claim 9, wherein said control means comprises:
   (A) subtracting means for subtracting said third prediction data formed by said third prediction data forming means from said fourth prediction data formed by said fourth prediction data forming means and for outputting the result of the subtraction; and
   (B) quantizing means for quantizing the result of the subtraction output from said subtracting means and for outputting the quantized result.

12. A decoding apparatus according to claim 11, wherein said quantizing means comprises a linear quantizer.

13. A decoding apparatus according to claim 11, wherein said quantizing means comprises a non-linear quantizer.

14. A decoding apparatus according to claim 11, wherein said decoding means has a plurality of different decoding characteristics and is arranged so as to decode the received code according to one of said plurality of different characteristics selected in response to the quantized result output from said quantizing means.

* * * * *

UNITED STATES PATENT AND TRADEMARK OFFICE
CERTIFICATE OF CORRECTION

PATENT NO. : 4,992,889

DATED : February 12, 1991

INVENTOR(S) : TAKU YAMAGAMI, ET AL.

It is certified that error appears in the above-identified patent and that said Letters Patent is hereby corrected as shown below:

COLUMN 1

Line 15, "or" should be deleted.
    Line 21, "one dimensional" should read --one-dimensional--.
    Line 25, "is," should read --is--.
    Line 26, "one dimensional" should read --one-dimensional--.
    Line 48, "pixels $X_{i-1}$" should read --pixels $x_{i-1}$--.

COLUMN 2

Line 14, "symbols ☐" should read --symbols [ ]--.
    Line 25, "value," should read --value--.

COLUMN 3

Line 19, "greatly changes" should read --changes greatly--.

COLUMN 4

Line 7, "variable length" should read --variable-length--.
    Line 30, "are" should be deleted.

COLUMN 5

Line 5, "differential vector signal when the vec-" should read --vector signal when the differential vec- --.
    Line 45, "systems" should read --system--.
    Line 64, "-$<x_{i-}>$]" should read -- -$<x_{i-1}>$]--.

UNITED STATES PATENT AND TRADEMARK OFFICE
CERTIFICATE OF CORRECTION

PATENT NO. : 4,992,889

DATED : February 12, 1991

INVENTOR(S) : TAKU YAMAGAMI, ET AL.

It is certified that error appears in the above-identified patent and that said Letters Patent is hereby corrected as shown below:

COLUMN 6

Line 45, "$(x_i'-<x_{i-1}>]$" should read --$[x_i'-<x_{i-1}>]$--.
Line 47, "$[x_i'-x_{i-1}>]$" should read --$[x_i'-<x_{i-1}>]$--.
Line 63, "very" should read --much--.

COLUMN 7

Line 6, "among" should read --amount--.
Line 45, "is," should read --is--.

COLUMN 8

Line 5, "two" should read --two- --.
Line 28, "two dimen-" should read --two-dimen- --.
Line 31, "three dimensional" should read --three-dimensional--.
Line 51, "a dimen-" should read --n dimen- --.
Line 63, "L" should be deleted.
Line 67, "vector $x=(dx_1,$" should read --vector $d_x=(dx_1,$--.

COLUMN 9

Line 2, "$<x>$" should read --$<dx>$--.
Line 46, "z" should be deleted.
Line 61, "$[C_i'-21C_{i-1}>]$" should read --$[C_i'-<C_{i-1}>]$--.

COLUMN 10

Line 58, "quuantization" should read --quantization--.

UNITED STATES PATENT AND TRADEMARK OFFICE
CERTIFICATE OF CORRECTION

PATENT NO. : 4,992,889
DATED : February 12, 1991
INVENTOR(S) : TAKU YAMAGAMI, ET AL.

It is certified that error appears in the above-identified patent and that said Letters Patent is hereby corrected as shown below:

COLUMN 12

Line 9, "decoded output" should read --decoded data output--.
    Line 22, "forming" should read --formed--.

Signed and Sealed this

Eighth Day of December, 1992

Attest:

DOUGLAS B. COMER

Attesting Officer    Acting Commissioner of Patents and Trademarks